United States Patent
Brenner et al.

(10) Patent No.: US 10,735,119 B2
(45) Date of Patent: *Aug. 4, 2020

(54) MODIFYING PLAYBACK OF CONTENT USING PRE-PROCESSED PROFILE INFORMATION

(71) Applicant: Gracenote, Inc., Emeryville, CA (US)

(72) Inventors: Vadim Brenner, San Francisco, CA (US); Markus K. Cremer, Orinda, CA (US); Michael Becker, San Francisco, CA (US)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/186,945

(22) Filed: Jun. 20, 2016

(65) Prior Publication Data

US 2016/0373197 A1    Dec. 22, 2016

Related U.S. Application Data

(63) Continuation of application No. 14/020,420, filed on Sep. 6, 2013, now Pat. No. 9,380,383.

(51) Int. Cl.
*G06F 17/00* (2019.01)
*H04H 60/47* (2008.01)
(Continued)

(52) U.S. Cl.
CPC ............ *H04H 60/47* (2013.01); *H04H 60/58* (2013.01); *H04H 60/65* (2013.01); *H04N 21/233* (2013.01);
(Continued)

(58) Field of Classification Search
CPC ........ H04H 60/47; H04H 60/58; H04H 60/65; H05N 21/233; H05N 21/23418;
(Continued)

(56) References Cited

U.S. PATENT DOCUMENTS 6,453,252 B1    9/2002  Laroche
6,587,127 B1    7/2003  Leeke et al.
(Continued)

FOREIGN PATENT DOCUMENTS

DE    202014010599 U1    3/2016
KR    20060116383          11/2006
(Continued)

OTHER PUBLICATIONS

ID3 draft specification; copyright 2000.*
(Continued)

*Primary Examiner* — Paul C McCord
(74) *Attorney, Agent, or Firm* — Hanley, Flight & Zimmerman, LLC

(57) ABSTRACT

Example methods and systems for modifying the playback of content using pre-processed profile information are described. In some example embodiments, the methods and systems may access a stream of content to be delivered to a playback device, identify a piece of content within the stream of content to be delivered to the playback device, determine a profile for the identified piece of content, and deliver the determined profile to the playback device. In some example embodiments, the methods and systems may receive a stream of content at a playback device, access profile information associated with the stream of content, and modify playback of the stream of content based on the accessed profile information.

10 Claims, 7 Drawing Sheets

(51) Int. Cl.
    *H04R 3/04*     (2006.01)
    *H04H 60/58*     (2008.01)
    *H04H 60/65*     (2008.01)
    *H04N 21/233*     (2011.01)
    *H04N 21/234*     (2011.01)
    *H04N 21/266*     (2011.01)
    *H04N 21/414*     (2011.01)
    *H04N 21/432*     (2011.01)
    *H04N 21/654*     (2011.01)
    *H04N 21/81*     (2011.01)

(52) U.S. Cl.
    CPC .. *H04N 21/23418* (2013.01); *H04N 21/26603* (2013.01); *H04N 21/26606* (2013.01); *H04N 21/41422* (2013.01); *H04N 21/4325* (2013.01); *H04N 21/654* (2013.01); *H04N 21/8106* (2013.01); *H04R 3/04* (2013.01); *H04R 2499/13* (2013.01)

(58) Field of Classification Search
    CPC ....... H05N 21/26603; H05N 21/26606; H05N 21/41422; H05N 21/4325; H05N 21/654; H05N 21/8106; H04R 3/04; H04R 2499/13
    USPC .......................................................... 700/94
    See application file for complete search history.

(56) References Cited

U.S. PATENT DOCUMENTS

| | | |
|---|---|---|
| 6,704,421 B1 | 3/2004 | Kitamura |
| 6,760,635 B1 | 7/2004 | Bates et al. |
| 6,834,308 B1 | 12/2004 | Ikezoye et al. |
| 6,963,975 B1 | 11/2005 | Weare |
| 7,181,297 B1 | 2/2007 | Pluvinage et al. |
| 7,711,129 B2 | 5/2010 | Lindahl et al. |
| 8,027,487 B2 | 9/2011 | Park |
| 8,615,316 B2 * | 12/2013 | Oh .................... G10L 19/008 700/94 |
| 8,755,530 B2 | 6/2014 | Kron |
| 9,160,837 B2 * | 10/2015 | Jeffrey ............. H04N 21/42203 |
| 9,380,383 B2 * | 6/2016 | Brenner ................ H04H 60/47 |
| 9,628,932 B2 | 4/2017 | Kron |
| 2002/0072816 A1 * | 6/2002 | Shdema ............. H04L 12/2805 700/94 |
| 2002/0159607 A1 | 10/2002 | Ford et al. |
| 2003/0007001 A1 | 1/2003 | Zimmerman |
| 2003/0045954 A1 | 3/2003 | Weare et al. |
| 2003/0154128 A1 * | 8/2003 | Liga .................... G06Q 30/0208 705/14.11 |
| 2004/0237750 A1 * | 12/2004 | Smith .................. G11B 27/034 84/1 |
| 2005/0020223 A1 | 1/2005 | Ellis et al. |
| 2005/0229204 A1 | 10/2005 | Kalker |
| 2006/0008252 A1 | 1/2006 | Kim |
| 2006/0046685 A1 | 3/2006 | Hjelmeland |
| 2008/0002839 A1 | 1/2008 | Eng |
| 2008/0003839 A1 * | 1/2008 | Park ....................... B82Y 30/00 438/800 |
| 2008/0027729 A1 | 1/2008 | Herre et al. |
| 2008/0049943 A1 * | 2/2008 | Faller .................... G10L 19/008 381/17 |
| 2008/0075303 A1 | 3/2008 | Kim et al. |
| 2008/0101638 A1 | 5/2008 | Ziller |
| 2008/0154401 A1 * | 6/2008 | Wang .................... G11B 27/11 700/94 |
| 2008/0175411 A1 | 7/2008 | Greve |
| 2009/0047993 A1 * | 2/2009 | Vasa .................... G11B 27/105 455/556.1 |
| 2009/0049634 A1 * | 2/2009 | Popov .................. A47L 11/164 15/229.12 |
| 2009/0062943 A1 | 3/2009 | Nason et al. |
| 2009/0222853 A1 * | 9/2009 | White .................... H04N 7/163 725/34 |
| 2009/0290725 A1 | 11/2009 | Huang |
| 2009/0313564 A1 | 12/2009 | Rottler et al. |
| 2010/0114344 A1 * | 5/2010 | Hannaby ................ G06Q 30/02 700/94 |
| 2010/0305729 A1 * | 12/2010 | Glitsch .............. H04N 21/2407 700/94 |
| 2010/0319015 A1 * | 12/2010 | Remington ............ H04H 20/10 725/19 |
| 2011/0251704 A1 | 10/2011 | Walsh et al. |
| 2011/0276333 A1 * | 11/2011 | Wang .................... G10L 25/48 704/270 |
| 2014/0003625 A1 * | 1/2014 | Sheen .................... H03G 5/005 381/103 |
| 2014/0180818 A1 * | 6/2014 | Mistler .............. G06Q 30/0259 705/14.57 |
| 2014/0355789 A1 * | 12/2014 | Bohrarper ................ H04R 3/00 381/119 |
| 2015/0073574 A1 | 3/2015 | Brenner et al. |
| 2016/0056787 A1 | 2/2016 | Lu et al. |
| 2017/0026768 A1 | 1/2017 | Kron |

FOREIGN PATENT DOCUMENTS

| | | |
|---|---|---|
| KR | 20070070728 | 7/2007 |
| KR | 20080011831 | 2/2008 |
| KR | 20090036220 | 4/2009 |
| WO | 03098627 A2 | 11/2003 |
| WO | 2012013858 | 2/2012 |
| WO | 2016169541 A1 | 10/2016 |

OTHER PUBLICATIONS

"U.S. Appl. No. 14/020,420, Advisory Action dated Dec. 30, 2015", 3 pgs.
"U.S. Appl. No. 14/020,420, Final Office Action dated Jul. 23, 2015", 15 pgs.
"U.S. Appl. No. 14/020,420, Non Final Office Action dated Apr. 20, 2015", 14 pgs.
"U.S. Appl. No. 14/020,420, Notice of Allowance dated Mar. 1, 2016", 8 pgs.
"U.S. Appl. No. 14/020,420, Pre-Appeal Brief Request for Review filed Jan. 22, 2016", 4 pgs.
"U.S. Appl. No. 14/020,420, Response filed May 28, 2015 to Non Final Office Action dated Apr. 20, 2015", 18 pgs.
"U.S. Appl. No. 14/020,420, Response filed Nov. 23, 2015 to Final Office Action dated Jul. 23, 2015", 13 pgs.
"ID3v2 frames", chapter frames, (2006).
Baluja et al., "Content Fingerprinting Using Wavelets", Google, Inc., Dec. 2006 (10 pages).
Haitsma et al., "Robust Audio Hashing for Content Identification", Philips Research, Feb. 2002 (8 pages).
Osxdaily, "How to Set the Equalizer for Specific Genres, Songs, & Albums in iTunes", retrieved from http://osxdaily.com/2013/03/25/how-to-equalize-specific-genres-songs-albums-in-itunes/, Mar. 25, 2013 (5 pages).
Kioskea.Net, "AIMP—Auto-adjust equalizer preset for your music tracks", Jun. 2014 (1 page).
Reddit.Com, "[Request]: automatically change equalizer settings based on currently playing song's genre (user configurable of course)", retrieved from https://www.reddit.com/r/jailbreak/comments/1zmlt8/request_automatically_change_equalizer_settings/, Mar. 5, 2014 (4 pages).
Ars Technica, "Auto change equalizer settings based on ID3 tag info", retrieved from https://arstechnica.com/civis/viewtopic.php?f=6&t=411960, Mar. 11, 2005 (3 pages).
Spotify, "Equalizer auto preset by music genre", The Spotify Community, retrieved from https://community.spotify.com/t5/Closed-Ideas/Equalizer-auto-preset-by-music-genre/idi-p/894673, Aug. 22, 2014 (7 pages).

* cited by examiner

MODIFYING PLAYBACK OF CONTENT USING PRE-PROCESSED PROFILE INFORMATION

CLAIM FOR PRIORITY

This application is a continuation of and claims the benefit of priority to U.S. application Ser. No. 14/020,420, filed Sep. 6, 2013, which is hereby incorporated by reference herein in its entirety.

TECHNICAL FIELD

The subject matter disclosed herein generally relates to the processing of data. Specifically, the present disclosure addresses systems and methods for modifying the playback of content using pre-processed profile information.

BACKGROUND

Many devices that play music and other audio content do not provide optimal playback experiences. For example, these devices (e.g., car stereos, mobile devices) may provide the same playback experience for drastically different types of content, such as a same experience for a rock recording, a classical recording, and a news-based radio program. Although most playback devices provide users with mechanisms to adjust the playback experience, users often do not have the knowledge of what adjustments to make, and may make adjustments that diminish and not enhance the playback experience. Also, as a listener may not know what audio content is coming up, the listener will then have to make changes after the song has already started in order to optimize the playback experience for the particular song. Further, adjusting the playback experience while driving vehicles may pose safety issues.

BRIEF DESCRIPTION OF THE DRAWINGS

Some embodiments are illustrated by way of example and not limitation in the figures of the accompanying drawings.

DETAILED DESCRIPTION

Overview

Example methods and systems for modifying the playback of content using pre-processed profile information are described. In some example embodiments, the methods and systems may access a stream of content to be delivered to a playback device, identify a piece of content within the stream of content to be delivered to the playback device, determine a profile for the identified piece of content, and deliver the determined profile to the playback device. These operations may be performed automatically on-the-fly.

In some example embodiments, the methods and systems may receive a stream of content at a playback device, access profile information associated with the stream of content, and modify playback of the stream of content based on the accessed profile information. For example, the methods and systems may receive and/or access an audio stream along with profile information identifying a mood or other characteristics assigned to the audio stream and modify playback settings of the playback device (e.g., equalization settings) based on the profile information.

The example methods and systems may, therefore, pre-process a content stream provided by a content provider to determine a profile for the content stream, and deliver the profile to a playback device, which may play the content stream with an adjusted, modified, and/or optimized playback experience, among other things.

In the following description, for purposes of explanation, numerous specific details are set forth to provide a thorough understanding of example embodiments. It will be evident to one skilled in the art, however, that the present subject matter may be practiced without these specific details.

Example Network Environment

Figure 1:
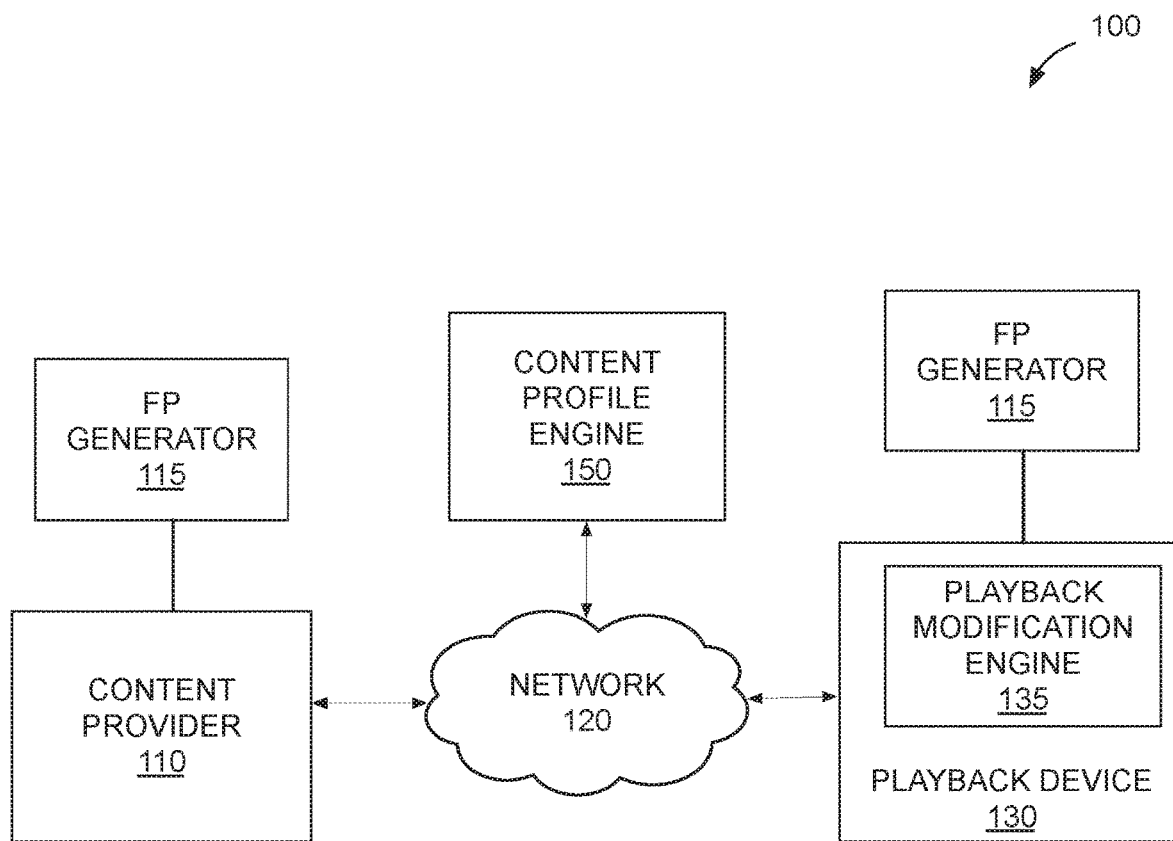
FIG. 1 is a network diagram illustrating a network environment suitable for modifying the playback of content using pre-processed profile information, according to some example embodiments.

FIG. 1 is a network diagram illustrating a network environment suitable for modifying the playback of content using pre-processed profile information, according to some example embodiments. The network environment 100 may include a content provider 110 or content source (e.g., a broadcaster, a network, a website, and so on), that provides various types of multimedia content, such as audio content and/or video content. Example content providers 110 may include terrestrial or satellite radio stations, online music services, online video services, television broadcasters and/or distributors, networked computing devices (e.g., mobile devices on a network), local audio or music applications, and so on. It should be noted that the content (e.g., audio and/or video content) may be obtained from any source. For example, the term "content source" is intended include users and other content owners (such as artists, labels, movie studios, etc.). In an example embodiment, the content source is a publically accessible website such as YouTube™.

A playback device 130 may receive a stream or streams of content from the content provider 110 over a network 120 such as the Internet. The network 120 may be any network or communication medium that enables communication between the content provider 110, the playback device 130, and other networked devices. The network 120, therefore, may be or include a wired network, a wireless network (e.g., a mobile network), a radio or telecommunications network, a satellite network, and so on. For example, the network 120 may include one or more portions that constitute a private network (e.g., a cable television network or a satellite radio network), a public network (e.g., over-the-air broadcast channels or the Internet), and so on.

The playback device 130 may include audio or video playback devices 130, such as car or personal stereo systems, televisions, set-top boxes, laptops and other personal computers, tablets and other mobile devices (e.g., smart phones), gaining devices, and/or other devices capable of receiving and presenting a stream of audio or video content. In some example embodiments, the playback device 130 may include a tuner configured to receive a stream of audio or video content and play the stream of audio or video content by processing the stream and outputting information (e.g., digital or analog) usable by a display of the playback device 130 to present or play back the audio or video content to a user associated with the playback device 130. The playback device 130 may also include a display or other user interface configured to display the processed stream of content and/or associated metadata. The display may be a flat-panel screen, a plasma screen, a light emitting diode (LED) screen, a cathode ray tube (CRT), a liquid crystal display (LCD), a projector, and so on.

In some example embodiments, the content provider 110 and/or the playback device 130 may include one or more fingerprint generators 115 configured to generate identifiers for content being transmitted or broadcast by the content provider 110 and/or received or accessed by the playback device 130. For example, the fingerprint generators 115 may include a reference fingerprint generator (e.g., a component that calculates a hash value from a portion of content) that is configured to generate reference fingerprints or other identifiers of received content, among other things.

In some example embodiments, the playback device 130 may include or be associated with a playback modification engine 135 configured to modify the playback experience of content played by the playback device 130. For example, the playback modification engine 135 may access a profile associated with a stream of content and utilize the profile to modify, adjust, and/or otherwise control various playback settings (e.g., equalization settings) associated with a quality or character for the playback of the content. In an example embodiment where the content is video or other visual content, the playback settings may include color palette settings, color layout settings, brightness settings, font settings, artwork settings, and so on.

In some example embodiments, a content profile engine 150 may access, over the network 120, a stream of content provided by the content provider 110, and perform various processes to determine, generate, and/or select a profile or profile information for the stream of content. For example, the content profile engine 150 may identify the stream of content (e.g., using audio or video fingerprint comparisons), and determine a profile for the identified stream of content. The content profile engine 150 may deliver the profile to the playback device 130, which receives the profile along with the stream of content, and plays the stream of content using certain playback settings that are associated and/or selected based on information within the received profile, among other things.

Any of the machines, databases, or devices shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 7. As used herein, a "database" is a data storage resource and may store data structured as a text file, a table, a spreadsheet, a relational database, a triple store, or any suitable combination thereof. Further, a database can exist within a device, a tethered/connected device (e.g., a smartphone connected to a car stereo), or via connected service on a network. It should be noted that any two or more of the machines illustrated in FIG. 1 may be combined into a single machine, and the functions described herein for any single machine may be subdivided among multiple machines.

Furthermore, any of the modules, systems, and/or generators may be located at any of the machines, databases, or devices shown in the FIG. 1. For example, the content profile engine 150 may be part of the content provider 110 and/or the playback device 130. As another example, the playback device 130 may include the content provider 110 (e.g., the playback device 130 is a mobile device having a music playback application and the content provider 110 is a local store of songs and other audio), among other configurations.

Examples of Modifying the Playback of Content

As described herein, in some example embodiments, the systems and methods identify content to be streamed or otherwise transmitted to the playback device 130 and generate and/or determine a profile to deliver to the playback device 130 that provides information associated with a mood, style, or other attributes of the content. In an example embodiment, the profile may be a simple identifier that merely identifies a content type. For example, the profile may identify the content as news, an action movie, a sports event, or the like. Different settings on a TV may then be automatically adjusted based on the profile. Similarly, the profile may identify a radio talk show, a song, a jingle, a song genre, or the like. Accordingly, audio settings may then be adjsuted automatically on-the-fly to enhance the audio delivered to a listener.

Figure 2:
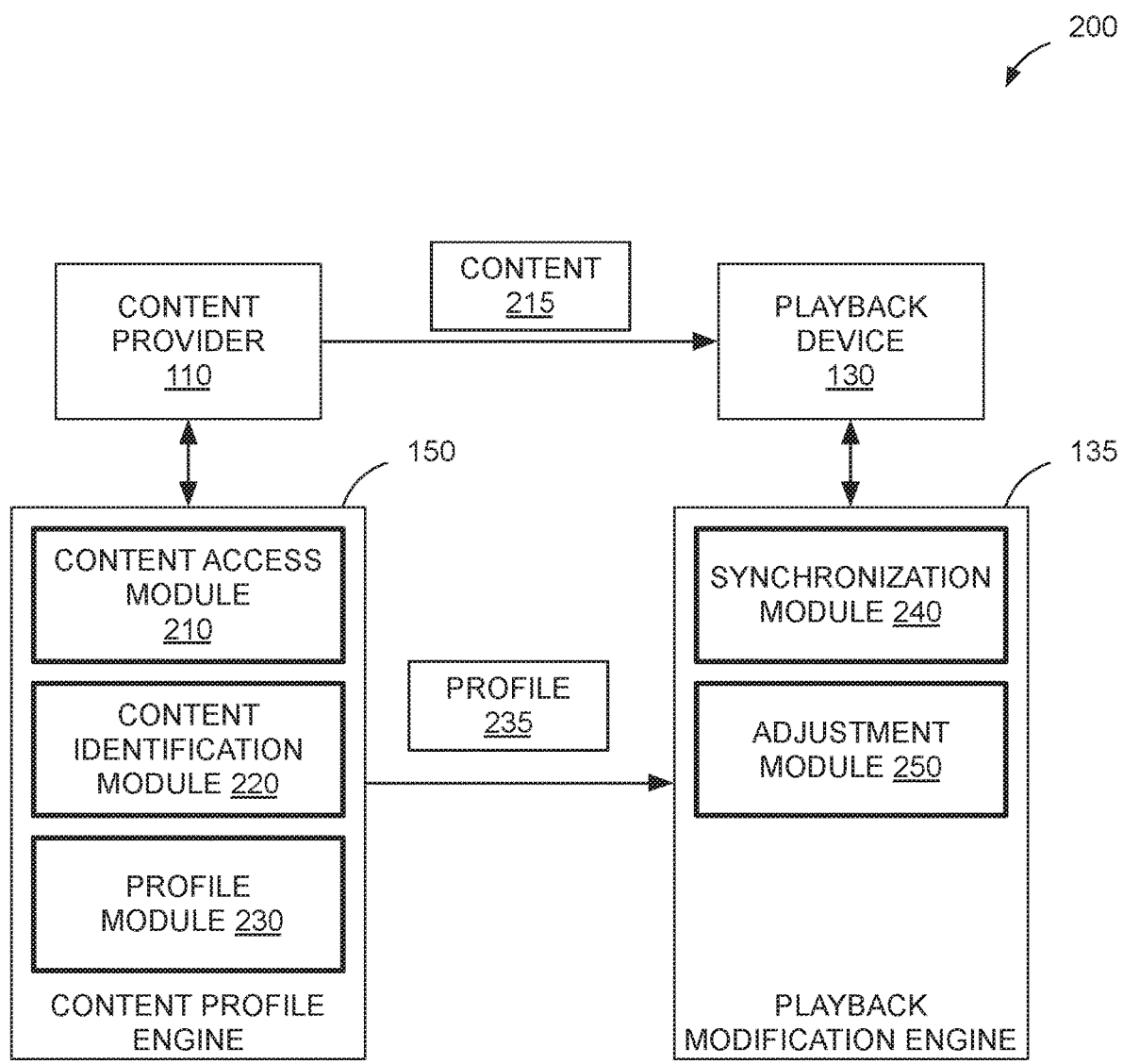
FIG. 2 is a block diagram illustrating components of a content profile engine and a playback modification engine, according to some example embodiments.

FIG. 2 is a block diagram illustrating components of the content profile engine 150 and the playback modification engine 135, according to some example embodiments. One or more of the modules described herein may be implemented using hardware (e.g., a processor of a machine) or a combination of hardware and software. Moreover, any two or more of these modules may be combined into a single module, and the functions described herein for a single module may be subdivided among multiple modules. Referring to FIG. 2, the content profile engine 150 may include a content access module 210, a content identification module 220, and a profile module 230.

In some example embodiments, the content access module 210 is configured and/or programmed to access a stream of content 215 to be delivered to a playback device 130. For example, the content access module 210 may access the stream of content 215 from the content provider 110 that is providing the stream of content 215 to the playback device 130 over the network 120. As another example, the content access module 210 may access a stream of content 215 from the content provider 110 that is locally stored by the playback device 130.

The content access module 210 may access various types of content streams 215, such as audio content streams, video streams, and so on. For example, the content access module 210 may access a stream of songs or other music, a stream of spoken content, a podcast, YouTube™ videos and clips, and so on.

In some example embodiments, the content identification module 220 is configured and/or programmed to identify a piece of content 215 within the stream of content 215 to be delivered to the playback device 130. The content identification module 220 may identify the piece of content 215 using a variety of processes, including a comparison of a fingerprint of the content 215 to reference fingerprints of known content 215, such as reference fingerprints generated by the fingerprint generator 115.

For example, the content identification module 220 may generate and/or access query fingerprints for a frame or block of frames of the piece or stream of content 215, and perform a comparison of the query fingerprints to the reference fingerprints in order to identify the piece of content or stream of content 215.

In some example embodiments, the profile module 230 is configured and/or programmed to determine a profile 235 for the identified piece or a segment/portion within a piece of content 215 and deliver the determined profile 235 to the playback device 130. For example, the profile module 230 may determine one or more characteristics for an entire portion of the piece of content 215 and/or may determine one or more characteristics for multiple portions of the piece of content 215, such as frames or blocks of frames of the content 215.

The profile module 230 may render, generate, create, and/or otherwise determine the profile 235 for the piece of content 215, such as audio content, having a variety of different characteristics. For example, the profile 235 may include characteristics associated with equalization (EQ) settings, such as different audio frequencies within the audio content.

The profile 235 may include different types of information. Example profile information may include:

information identifying a category associated with the song, such as a category for a style of music (e.g., rock, classical, hip-hop, instrumental, spoken-word, jingle and so on);

information identifying a category associated with a video segment, such as style of video (e.g. drama, sci-fi, horror, romance, news, TV show, documentary, advertisement, and so on);

information identifying a mood associated with the song or video clip, such as upbeat mood, a relaxed mood, a soft mood, and so on;

information identifying signal strength parameters for different frequencies within the content, such as low frequencies for bass and other similar tones, high frequencies for spoken or sung tones; and/or information identifying color palette, brightness, sharpness, motion, blurriness, presence of text and/or subtitles or close caption, specific content with said text or subtitles, scene cuts, black frames, presence of display format adjustment bars/pillars, presence or absence of faces, landscapes, or other objects, presence of specific company, network, or broadcast logos, and so on.

Therefore, the profile 235 may represent the "DNA" or playback attributes of the audio content 215, which may be used by the playback modification engine 135 to control the playback device 130 in order to optimize or enhance the experience during playback of the audio content 215, among other things.

Referring back to FIG. 2, the playback modification engine 135 may include a synchronization module 240 and an adjustment module 250. In some example embodiments, the synchronization module 240 is configured and/or programmed to synchronize the profile 235 to the piece of content 215. In an example embodiment, the playback modification engine 135 includes a sequencing module configured to order (or modify the order) in which media items (e.g., songs) are played. It should be noted that the sequencing module (or parts thereof) can also reside in the cloud as part of a service/network.

For example, the synchronization module 240 may utilize a fingerprint or fingerprints associated with the piece of content 215 to synchronize the piece of content 215 to the profile 235. For example, the profile 235 may include information that relates one or more settings to a known fingerprint for the piece of content 215 align the settings to a portion of the piece of content 215 in order to synchronize the profile 235 to the piece of content 215 during playback of the content 215.

As another example, the synchronization module 240 may identify various audio or acoustic events within the piece of content 215 (e.g., a snare hit, the beginning of a guitar solo, an initial vocal), and align the profile 235 to the events within the content 215 in order to synchronize the profile 235 to the piece of content 215 during playback of the content 215. In an example embodiment, the sequencing module may organize the sequence of songs as part of an adaptive radio, a playlist recommendation, a playlist of content in the cloud (music and/or video) that is specific to currently rendered content (e.g., using its profile), user's profile, device settings that are known in advance to provide personalized optimal experience, and so on.

In some example embodiments, the adjustment module 250 is configured and/or programmed to modify playback of the piece of content 215 using the playback device 130 based on the profile 235 for the piece of content 215. For example, the adjustment module 250 may apply information within the profile 235 to modify or adjust the settings of an equalizer and or a dynamic processor of the playback device 130, in order to adjust and/or tune the equalization during the playback of the stream of content 215. When the content is video, the profile may be used to adjust video settings such as color temperature, dynamic range, color palette, brightness, sharpness, or any other video-related settings.

In addition to the equalization, the adjustment module 250 may adjust a variety of different playback settings, such as equalization settings, virtualization settings, spatialization settings, and so on. For example, the adjustment module 250 may access information identifying a genre assigned to the stream of content and modify playback of the stream of content by adjusting equalization settings of a playback device to settings associated with the identified genre. As another example, the adjustment module 250 may access information identifying signal strength parameters for different frequencies of the stream of content and modify playback of the stream of content by adjusting equalization settings of a playback device to settings using the signal strength parameters.

Thus, as shown in FIG. 2, the content profile engine 150 may generate and deliver the profile 235 to the playback modification engine 135, which adjusts the playback settings of the playback device 130 during playback of the stream of content 215, among other things.

Figure 3:
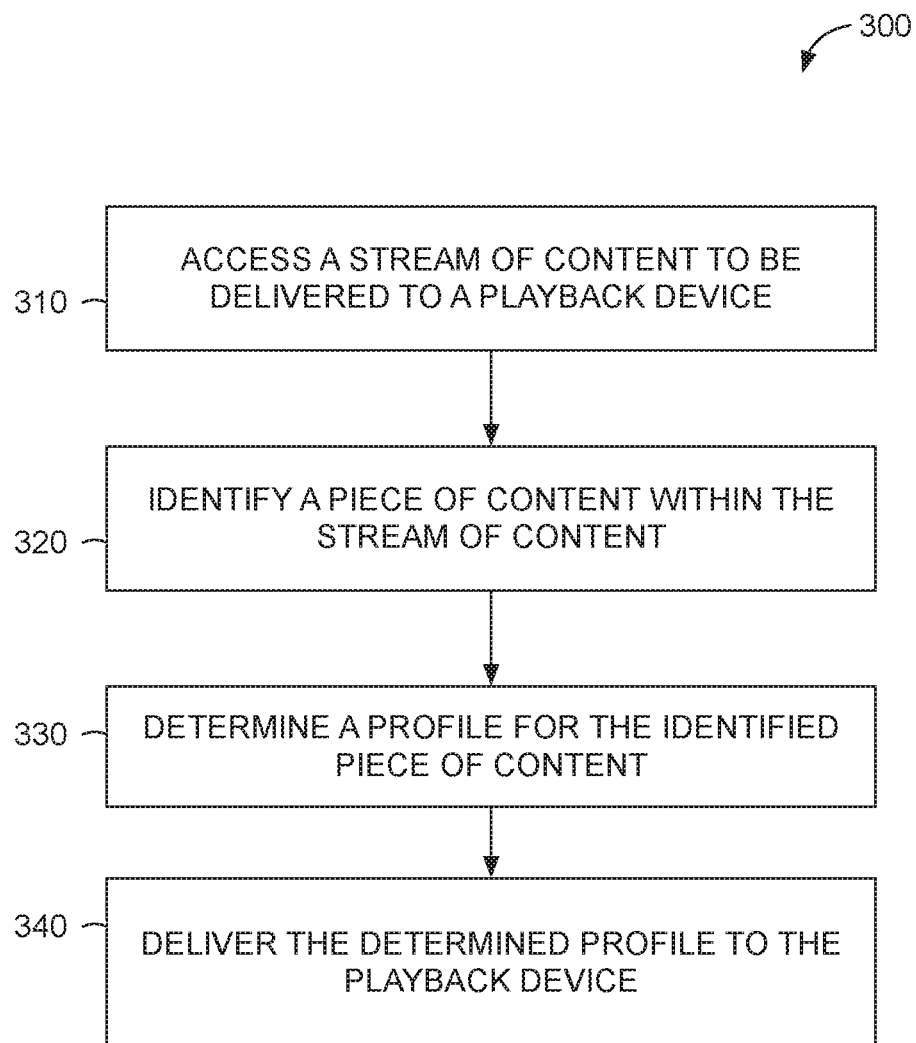
FIG. 3 is a flow diagram illustrating an example method for delivering profile information along with a stream of content to a playback device, according to some example embodiments.

As described herein, in some example embodiments, the content profile engine 150 determines and/or generate profiles 235 for content 215 to be delivered to the playback device 130, among other things. FIG. 3 is a flow diagram illustrating an example method 300 for delivering profile information along with a stream of content 215 to a playback device 130, according to some example embodiments. The method 300 may be performed by the content profile engine 150 and, accordingly, is described herein merely by way of reference thereto. It will be appreciated that the method 300 may be performed on any suitable hardware.

In operation 310, the content profile engine 150 accesses a stream of content to be delivered to a playback device 130. For example, the content access module 210 may access the stream of content 215 from the content provider 110 that is providing the stream of content 215 to the playback device 130 over the network 120. As another example, the content access module 210 may access a stream of content 215 from the content provider 110 that is locally stored by the playback device 130. As described herein, the content access module 210 may access various types of content streams, such as audio content streams, video streams, and so on. For example, the content access module 210 may access a stream of songs or other music, a stream of spoken content, a podcast, and so on.

In operation 320, the content profile engine 150 identifies a piece of content within the stream of content to be delivered to the playback device 130. For example, the content identification module 220 may identify the piece of content 215 using a variety of processes, including a comparison of a fingerprint for the content to a set of reference fingerprints associated with known content, such as reference fingerprints generated by the reference fingerprint generator 115. Of course, the content identification module 220 may identify the piece of content using other information, such as metadata (e.g., information identifying an associated title, artist, genre, and so on) associated with the piece of content, information associated with the content provider 110, and so on.

In some example embodiments, the content identification module 220 may identify a certain category type or genre associated with the piece of content 215. For example, instead of identifying the piece of content as a specific piece of content (e.g., a specific song, YouTube™ videos/clips, TV programs, movies, podcast, and so on), the content identification module 220 may identify a genre or category applied to the piece of content 215 using the techniques described herein.

In operation 330, the content profile engine 150 determines a profile for the identified piece of content. For example, the profile module 230 may determine one or more characteristics for an entire portion of the piece of content and/or may determine one or more characteristics for multiple portions of the piece of content 215, such as frames or blocks of frames of the content. For example, the profile 235 may include a first set of one or more characteristics for a first portion of the piece of content 215, a second set of one or more characteristics for a second portion of the piece of content 215, and so on.

In some example embodiments, the profile module 230 renders, generates, creates, and/or otherwise determines the profile 235 for the piece of content 215, such as audio content having a variety of different characteristics. For example, the determined or generated profile 235 may include characteristics associated with equalization (EQ) settings, spatialization settings, virtualization settings, video settings, and so on In operation 340, the content profile engine 150 delivers the determined profile 235 to the playback device 130. For example, the profile module 230 may deliver the determined profile 235 to the playback device 130 over the network 120 or via other communication channels.

For example, the content profile engine 150 may access a piece of content that is a song to be streamed to a playback device that is a car stereo, identify the song as a specific song, which is associated with a genre of "classical music," determine a profile that includes a set of equalization settings to be used when playing the song via the car stereo (e.g., signal strength indicators for different frequencies within the song, speaker spatialization settings, and so on), and deliver the profile to the car stereo to be consumed by a network associated with the car stereo, such as a car area network (CAN), which controls the operation of the car stereo.

In another example embodiment, the content profile engine 150 may access a piece of content that is a movie to be streamed via a broadcast network or the intrenet to a playback device that is a TV set or set top box, identify the movie as being a specific movie as a specific movie, which is associated with a genre of "action", and as possessing a lot of fast action sequences, determine a profile that includes a set of image processing settings to be used when playing the movie via the TV set or other device (e.g. color palette settings, frame rate upscaling settings, contrast enhancement settings for low contrast scenes, etc.), and deliver the profile to the TV set or other device for adjusting the rendering and thus the content experience by the user.

Figure 4:
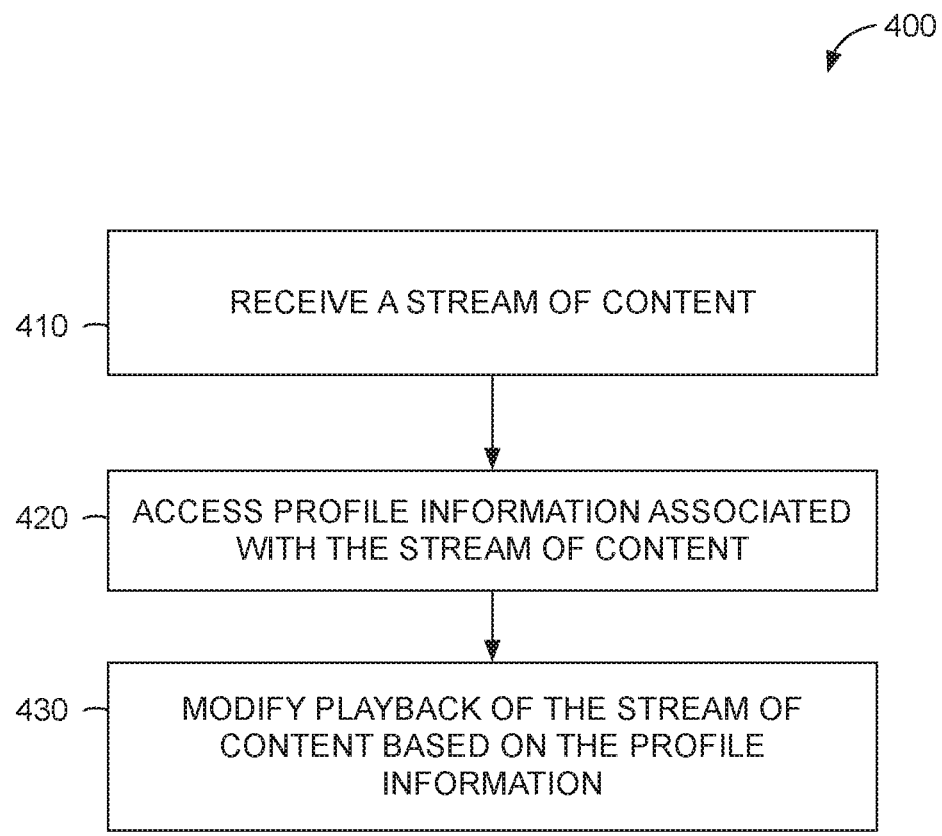
FIG. 4 is a flow diagram illustrating an example method for playing content using modified playback settings, according to some example embodiments.

As described herein, in some example embodiments, the playback modification engine 135 modifies or adjusts the playback of content by the playback device 130, among other things. FIG. 4 is a flow diagram illustrating an example method 400 for playing content using modified playback settings, according to some example embodiments. The method 400 may be performed by the playback modification engine 135 and, accordingly, is described herein merely by way of reference thereto. It will be appreciated that the method 400 may be performed on any suitable hardware.

In operation 410, the playback modification engine 135 receives and/or accesses a stream of content at or associated with a playback device. For example, the playback modification engine 135 may access a content stream about to be played by the playback device 130.

In operation 420, the playback modification engine 135 accesses profile information associated with the stream of content. For example, the playback modification engine 135 may receive a profile or profile information that is generated by the content profile engine 150. As described herein, the content profile engine 150 may determine the profile by identifying the stream of content based on a comparison of fingerprints associated with the stream of content to a set of fingerprints associated with known content, and select or otherwise determine the profile 235 that is associated with the identified stream of content.

The profile 235 may include various types of information, such as information identifying a category or genre associated with the song, information identifying a mood associated with the song, such as upbeat mood, a relaxed mood, a soft mood, and so on, information identifying signal strength parameters for different frequencies within the content, such as low frequencies for bass and other similar tones, high frequencies for spoken or sung tones, prosodic information and/or language information obtained from spoken content, and so on.

Similarity, the profile 235 may include information identifying a category or genre associated with video, or a segment of a video clip, information identifying a mood associated with the video, information identifying brightness, color palette, color contrast, luminance range, blurriness, display format, video scene information, information obtained from visual object detection and/or recognition, or face detection and or recognition, or broadcast logo detection and/or recognition algorithms, presence and/or content of text or subtitles, presence and/or content of watermarks, and so on In operation 430, the playback modification engine 135 modifies the playback of the stream of content based on the accessed profile information. For example, the adjustment module 250 may apply information within the profile 235 to modify or adjust the settings of an equalizer of the playback device 130, in order to adjust and/or tune the equalization during the playback of the stream of content 215. In addition to the equalization, the adjustment module 250 may adjust a variety of different playback settings, such as virtualization settings, spatialization settings, and so on.

In some example embodiments, the playback modification engine 135 may access a profile that includes multiple settings that relate to different portions of the content. For example, a song may include portions having different tempos, and the corresponding profile generated for the song may include first portion having a setting of "slow," a second portion having a setting of "fast," and a third portion having the setting of "slow," among other things. The playback modification engine 135, which may receive the profile from a different platform than the playback device 130 may synchronize the profile to the song in order to accurately adjust the playback settings using the multiple settings contained by the profile.

Figure 5:
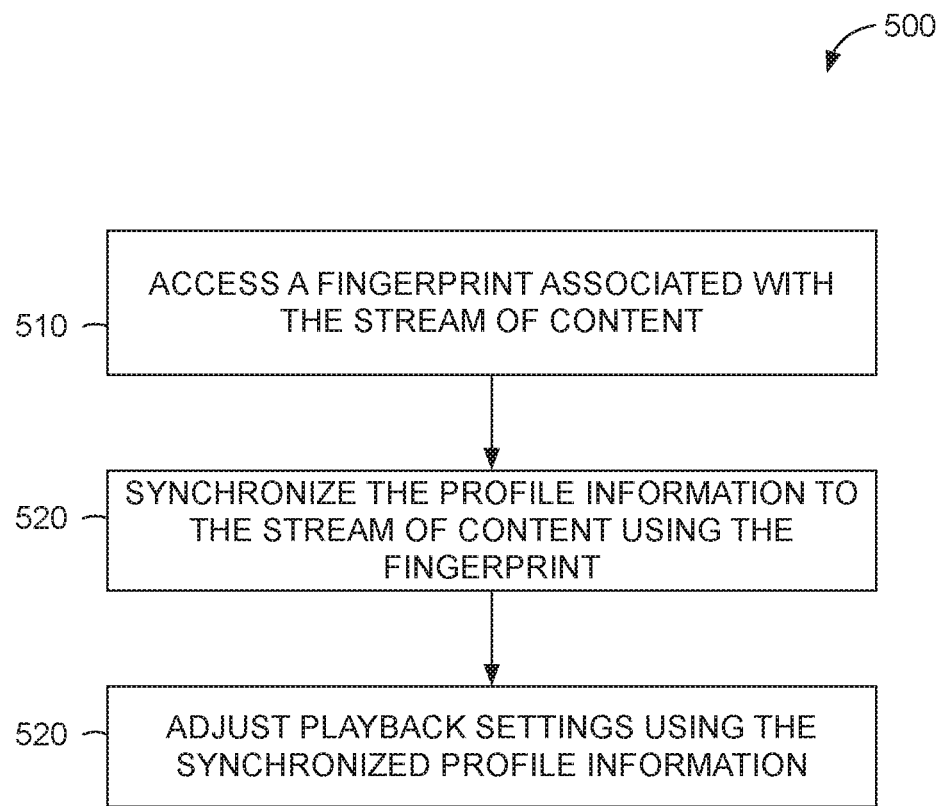
FIG. 5 is a flow diagram illustrating an example method for adjusting playback settings based on profile information associated with content, according to some example embodiments.

FIG. 5 is a flow diagram illustrating an example method 500 for adjusting playback settings based on profile information associated with content, according to some example embodiments. The method 500 may be performed by the playback modification engine 135 and, accordingly, is described herein merely by way of reference thereto. It will be appreciated that the method 500 may be performed on any suitable hardware.

In operation 510, the playback modification engine 135 accesses the profile 235 for the piece of content 215. For example, the playback modification engine 135 may access different types of profiles, such as single setting profiles, multiple setting profiles, and so on.

Figure 6A:
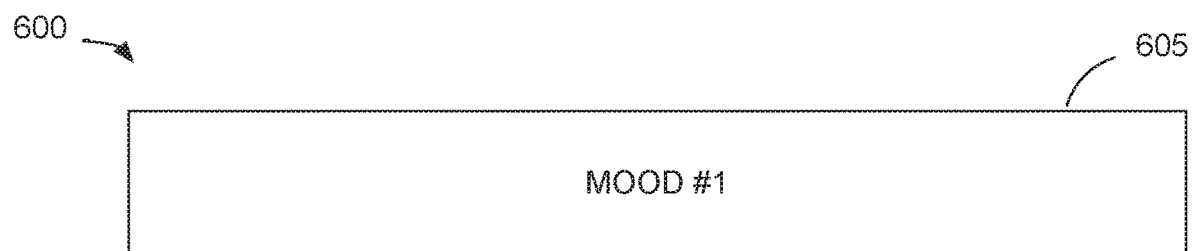
FIGS. 6A-6B are schematic diagrams illustrating example content profiles, according to some example embodiments.
Figure 6B:
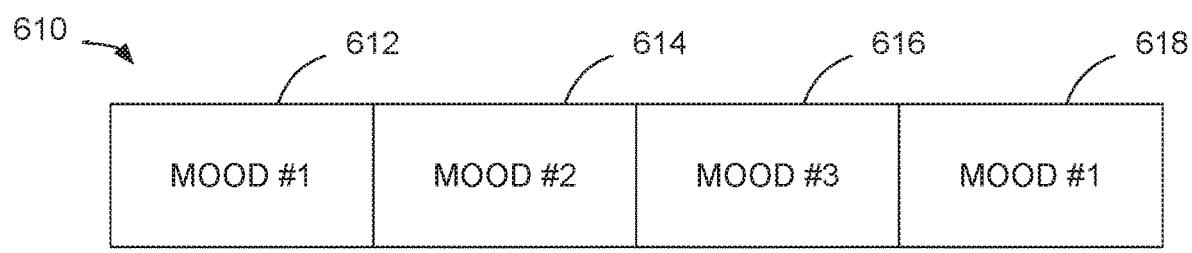

FIGS. 6A-6B are schematic diagrams illustrating example content profiles, according to some example embodiments. FIG. 6A depicts a content profile 600 that includes a single setting 605, or "mood #1" for an entire piece of content. On the other hand, FIG. 6B depicts a content profile 610 that includes multiple different settings for the piece of content. For example, the content profile 610 includes a first setting 612 (e.g., "mood #1"), a second setting 614 (e.g., "mood #2"), a third setting 616 (e.g., "mood #3"), and a fourth setting 618 (e.g., "mood #1), among other settings.

Referring back to FIG. 5, in operation 520, the playback modification engine 135 synchronizes the profile 235 to the piece of content 215. For example, the synchronization module 240 may utilize a fingerprint or fingerprints associated with the piece of content 215 to synchronize the piece of content to the profile 235. The profile 235 may include information that relates one or more settings to a known fingerprint for the piece of content and aligns the settings to a portion of the piece of content 215 in order to synchronize the profile 235 to the piece of content during playback of the content 215. As another example, the synchronization module 240 may identify various audio events within the piece of content (e.g., a snare hit, the beginning of a guitar solo, an initial vocal), and align the profile 235 to the events within the content 215, in order to synchronize the profile 235 to the piece of content during playback of the content 215.

In operation 530, the playback modification engine 135 modifies the playback of the piece of content 215 using the playback device 130 based on the synchronized profile for the piece of content 215. For example, the adjustment module 250 may apply information within the profile 235 to modify or adjust the settings of an equalizer of the playback device 130, in order to adjust and/or tune the equalization during the playback of the stream of content 215. Likewise, when the content is video, the profile 235 may be used to adjust video-related settings.

Therefore, in some example embodiments, the playback modification engine 135 may utilize complex or multilayered profiles, which include different settings to be applied to different portions of content, in order to dynamically adjust the playback experience of the content at different times during the playback of the content, among other things.

Thus, the systems and methods described herein may provide a platform that facilitates a real-time, or near real-time, processing and delivery of profile information (e.g., a content profile) to a playback device, which utilizes the content profile to adjust a playback experience (e.g., video and/or audio expereince) associated with playing the content to users, among other things. This may entail buffering the content before rendering of the content until a profile can be retrieved or predicted. In one embodiment, a specific profile may be applied based on usage history (e.g. the user has consumed a specific content type associated with a specific profile at this time of day/week for the past several days/weeks, so the same profile will be applied again after determination of the usage pattern). In another embodiment, the user has earlier established preference of a specific profile with a specific type of content (e.g. a video clip categorized as TV drama), so going forward content that profile will be automatically applied for the same or similar types of content. Another way of predicting a profile for a user may be through applying collaborative filtering methods, where profiles of other users are inferred on a particular user based on usage patterns, demographic information, or any other information about a user or user group. Yet another embodiment is including device settings such as content source setting, e.g. the selected input on a TV set, such as the input that connects to a set top box, vs. the input that connects to a DVD player or game console, to determine or influence the profile selection. Many playback devices 130 may utilize such a platform, including:

A car stereo system that receives and plays content from an online, satellite, or terrestrial radio station and/or from a locally stored content player (e.g., CD player, MP3 player, and so on);

A home stereo system that receives and plays content from an online, satellite, or terrestrial radio station and/or from a locally stored content player e.g., CD player, MP player, a TV set, a Set-Top-Box (STB), a game console, and so on);

A mobile device (e.g., smart phone or tablet) that receives and plays content (e.g., video and/or audio) from an online, satellite, or terrestrial radio station and/or from a locally stored content player (e.g., MP3 player); and so on.

In some example embodiments, the systems and methods may enhance and/or optimize low quality or low volume recordings and other content. For example, the content profile engine 150 may identify a stream of content (e.g., a homemade podcast) as having low audio quality, and generate a profile for the low quality stream of content that includes instructions to boost the playback of the content. The playback modification engine 135 may then adjust the playback settings of the playback device 130 (e.g., a mobile device) to boost the fidelity of the playback of the low quality content, among other things.

In some example embodiments, the systems and methods may diminish the quality of certain types of content, such as advertisements within a content stream. For example, the content profile engine 150 may identify a stream of content includes a commercial break, and generate a profile for the stream of content that lowers the playback quality during the commercial break. The playback modification engine 135 may then adjust the playback settings of the playback device 130 (e.g., a mobile device) to lower the fidelity of the playback of the content during the commercial break, among other things. Of course, other scenarios may be possible.

Figure 7:
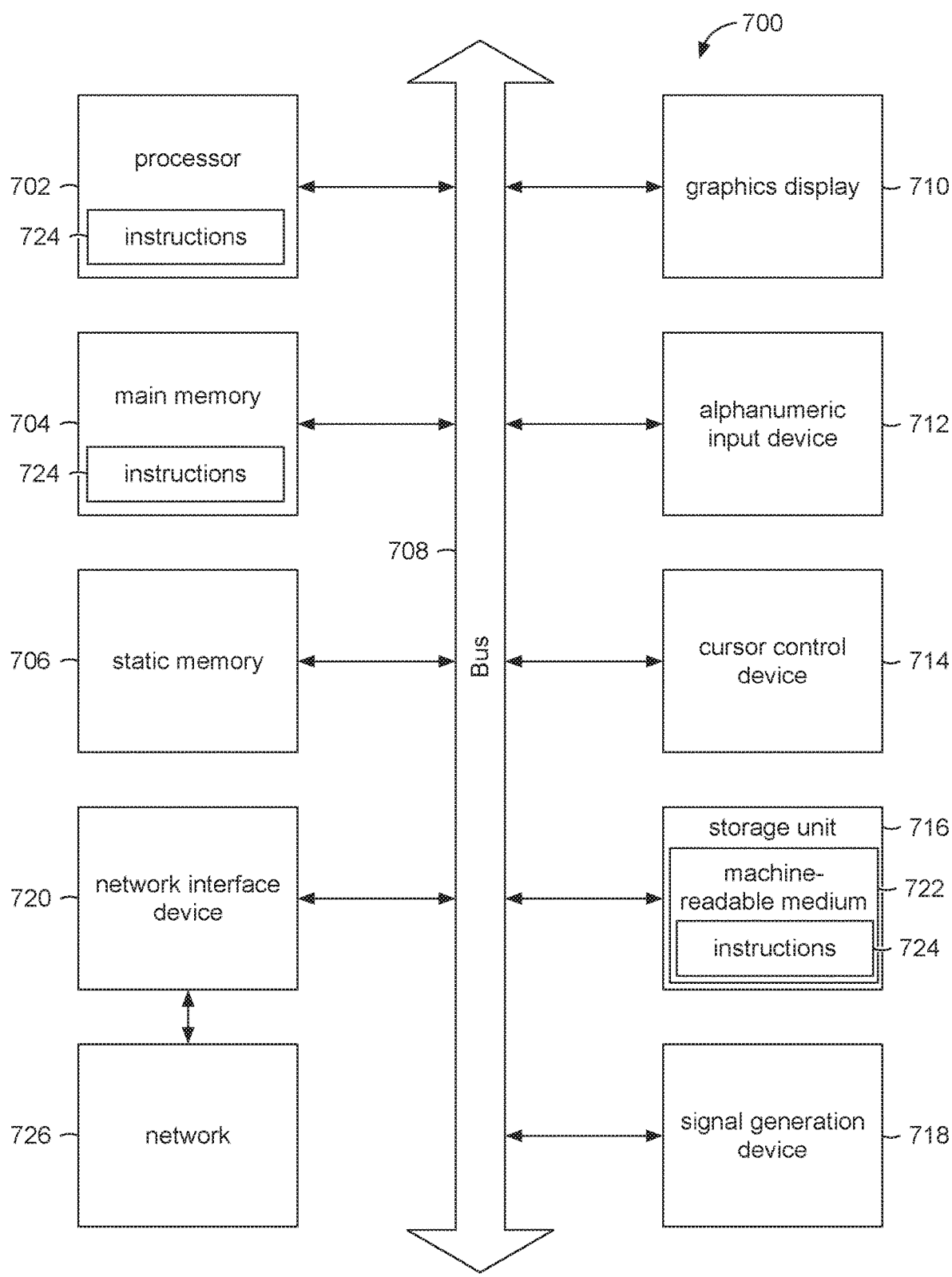
FIG. 7 is a block diagram illustrating components of a machine, according to some example embodiments, able to read instructions from a machine-readable medium and perform any one or more of the methodologies discussed herein.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system and within which instructions 724 (e.g., software) for causing the machine 700 to perform any one or more of the methodologies discussed herein may be executed. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer, a tablet computer, a laptop computer, a netbook, an set top box, a personal digital assistant, a cellular telephone, a smartphone, a web appliance, a network router, a network switch, a network bridge, or any machine capable of executing the instructions 724 (sequentially or otherwise) that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 70 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), an LED display, an LCD, a projector, or a CRT). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 (e.g., network 120) via the network interface device 720.

As used herein, the term "memory" refers to a machine-readable medium able to store data temporarily or permanently and may be taken to include, hut not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., software) for execution by the machine (e.g., machine 700), such that the instructions, when executed by one or more processors of the machine (e.g., processor 702), cause the machine 700 to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 722 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 702 or a group of processors 701) may be configured by software 724 (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor 702, such as a field programmable gate array (FPGA) or an ASIC. A hardware module may also include programmable logic or circuitry that is temporarily configured by software 724 to perform certain operations. For example, a hardware module may include software 724 encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
accessing, by executing an instruction with a processor, a media stream to be provided to a device via a network, the media stream including a piece of media;
identifying, by executing an instruction with the processor, the piece of media using a comparison of a reference fingerprint of the piece of media to a query fingerprint generated based on the piece of media;
selecting, by executing an instruction with the processor, a profile of equalization parameters from a plurality of profiles, the selected profile corresponding to the identified piece of media and specifying at least one corresponding output frequency parameter to be used when outputting the piece of media at the device, the selecting of the profile being enabled by the identifying of the piece of media; and
providing, in response to the selection of the profile of equalization parameters and by executing an instruction with the processor, the selected profile of equalization parameters and the media stream to the device via the network.

2. The method of claim 1, wherein the selected profile of equalization parameters specifies the at least one corresponding output frequency parameter by specifying a frequency equalization setting for the piece of media.

3. The method of claim 1, wherein:
the selected profile of equalization parameters is included in a selected profile of equalization parameters that corresponds to the identified piece of media and specifies at least one of a virtualization setting for the piece of media or a spatialization setting for the piece of media.

4. The method of claim 1, wherein:
the selected profile of equalization parameters specifies the at least one corresponding output frequency parameter by specifying a video modification parameter selected from a group consisting of: a color temperature for the piece of media and a color palette for the piece of media.

5. The method of claim 1, wherein:
the selected profile of equalization parameters includes a plurality of sub-profiles of equalization parameters, each of the plurality of sub-profiles corresponding to a different portion of the piece of media, a first sub-profile corresponding to a first portion of the piece of media and specifying a first output frequency parameter for the first portion, a second sub-profile corresponding to a second portion of the piece of media and specifying a second output frequency parameter for the second portion.

6. The method of claim 5, wherein:
the first portion of the piece of media has a first musical tempo, and the first output frequency parameter specified by the first sub-profile corresponds to the first musical tempo; and
the second portion of the piece of media has a second musical tempo, and the second output frequency parameter specified by the second sub-profile corresponds to the second musical tempo.

7. The method of claim 1, wherein:
the profile of equalization parameters corresponds to a genre of the identified piece of media, the genre being selected from a plurality of available genres of media; and
the selecting of the profile of equalization parameters includes selecting the profile based on the genre of the identified piece of media.

8. The method of claim 1, wherein:
the profile of equalization parameters corresponds to a mood of the identified piece of media, the mood being selected from a plurality of available moods of media; and
the selecting of the profile of equalization parameters includes selecting the profile based on the mood of the identified piece of media.

9. A system comprising:

one or more hardware processors; and a memory storing instructions that, when executed by the one or more hardware processors, cause the system to at least:

access a media stream to be provided to a device via a network, the media stream including a piece of media;

identify the piece of media using a comparison of a reference fingerprint of the piece of media to a query fingerprint generated based on the piece of media;

select a profile of equalization parameters from a plurality of profiles, the selected profile corresponding to the identified piece of media and specifying at least one corresponding output frequency parameter to be used when outputting the piece of media, the selecting of the profile being enabled by the identifying of the piece of media; and provide, in response to the selection of the profile, the selected profile of equalization parameters and the media stream to the device via the network.

10. A non-transitory machine-readable storage medium comprising instructions that, when executed by one or more hardware processors of a machine, cause the machine to at least:

access a media stream to be provided to a device via a network, the media stream including a piece of media;

identify the piece of media using a comparison of a reference fingerprint of the piece of the media to a query fingerprint generated based on the piece of media;

select a profile of equalization parameters from a plurality of profiles, the selected profile corresponding to the identified piece of media and specifying at least one corresponding output frequency parameter to be used when outputting the piece of media, the selecting of the profile being enabled by the identifying of the piece of media; and provide, in response to the selection of the profile of equalization parameters, the selected profile of equalization parameters and the media stream to the device via the network.

* * * * *